R. D. HILLS.
FLEXIBLE ADJUSTABLE MAGNETO COUPLING.
APPLICATION FILED JULY 28, 1919.
1,340,610.
Patented May 18, 1920.
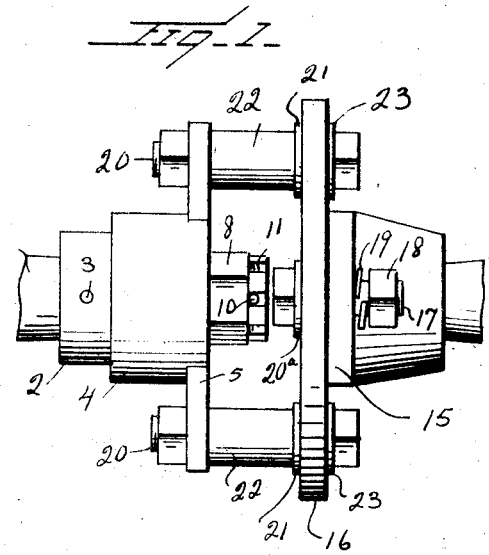
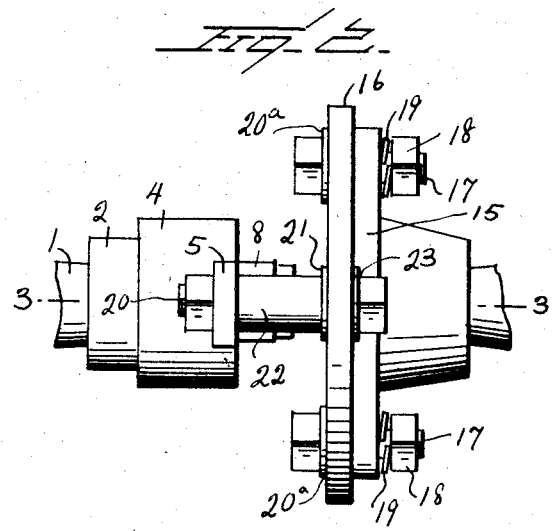
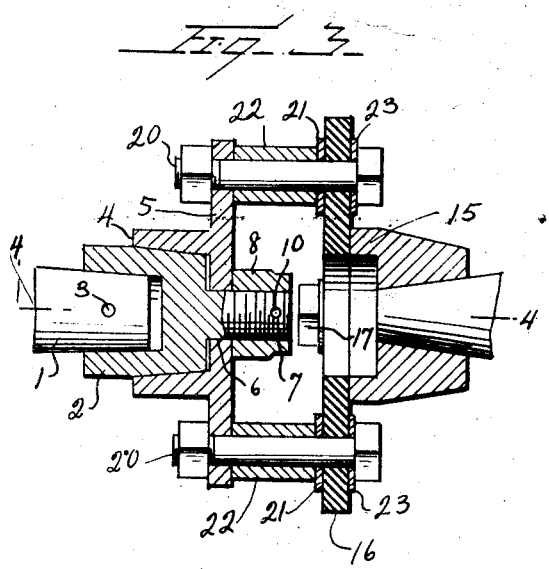
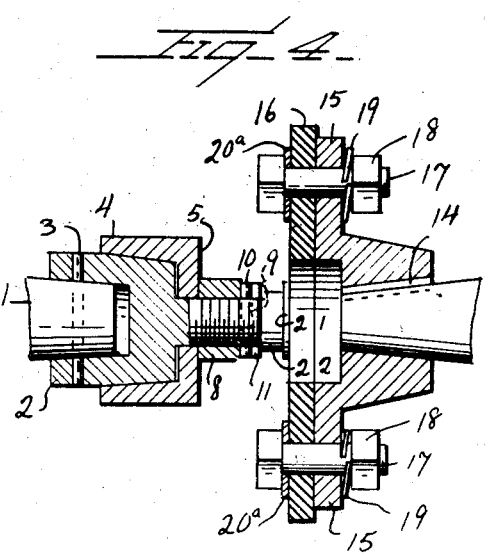
Inventor
R.D. Hills
By Watson E. Coleman
Attorney

UNITED STATES PATENT OFFICE.

RAY D. HILLS, OF BLANCHARD, IOWA.

FLEXIBLE ADJUSTABLE MAGNETO-COUPLING.

1,340,610.　　　　　Specification of Letters Patent.　　Patented May 18, 1920.

Application filed July 23, 1919. Serial No. 313,912.

*To all whom it may concern:*

Be it known that I, RAY D. HILLS, a citizen of the United States, residing at Blanchard, in the county of Page and State of Iowa, have invented certain new and useful Improvements in Flexible Adjustable Magneto-Couplings, of which the following is a specification, reference being had to the accompanying drawings.

This invention relates to an improved flexible adjustable magneto coupling, and one of the objects of the invention is to provide a device of this character, which is efficient and practical in construction, and may be manufactured for a relatively low cost and sold at a reasonable profit.

A further object of the invention is to provide a coupling of this kind, which is simple and involves improved features of construction, and is particularly adapted for connecting the magneto tapered shaft and the magneto driving shaft, so that the former may be driven by the latter efficiently and effectively, and also accurately, whereby the magneto tapered shaft may flex relatively to the magneto driving or pump shaft.

One of the features of the invention is the provision of a coupling of this character, comprising a member carried by the magneto driving shaft, in combination with an element adjustably connected to a cone member of the magneto tapered shaft, there being a flexible fiber connection between the member and the element, whereby one shaft section is capable of flexing relatively to the other shaft section and vice versa.

While the design and construction at present set forth and illustrated is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in elevation of the improved coupling connecting the two shaft sections, one constituting a magneto tapered shaft, the other constituting a magneto driving shaft.

Fig. 2 is a plan view.

Fig. 3 is a longitudinal sectional view on the line 3—3 of Fig. 2.

Fig. 4 is a sectional view on line 4—4 of Fig. 3 at right angles to the construction shown in Fig. 3.

Referring more especially to the drawings, 1 designates a portion of the magneto shaft, to which a tapered extension 2 is secured by a transverse pin 3. This extension 3, which is tapered, fits into a socket member 4, which is carried by a plate 5. The end wall of the socket member has an opening 6, to receive the reduced threaded end 7 of the tapered extension, there being a nut 8 threaded on the threaded end, to hold the tapered extension in the socket. The reduced threaded end of the tapered extension has a transverse hole 9, to receive a pin 10, which may engage any two opposite notches 11 of the nut, thereby preventing the detachment of the tapered extension. It will be seen that by loosening the nut, the tapered magneto shaft may be adjusted annularly with relation to the socket, so that the shaft may properly coöperate with its contacts, in order to properly make and break the magneto circuit.

Keyed at 14 to the magneto driving shaft is a plate 15, to which a disk 16 is secured by means of bolts 17, which pass through the disk and the plate 15 and are provided with nuts 18, there being spring split washers 19 between the nuts and the end parts of the plate. Washers 20$^a$ are interposed between the heads of the bolts and the disk. This flexible disk may be constructed of flexible leather or the like, though not necessarily, for it is obvious that any other suitable flexible fiber may be employed.

Extending through the flexible disk or ring and positioned at right angles to the bolts (which secure the flexible disk to the plate 15) are bolts 20, which also pass through the first plate 5, which is disposed at right angles to the plate 15, there being nuts threaded upon the bolts 20 in contact with the end portions of the plate 5, to hold the bolts and the plate 5 in position. Washers 21 are mounted upon the bolts 20, and sleeves 22 are also in surrounding relation to the bolts 20, and are interposed between the washers 21 and the end parts of the plate 5, thereby spacing the plate 5 relatively to the flexible disk or ring.

It will be seen by means of this flexible disk or ring that the two shaft sections, the magneto tapered shaft section and the magneto driving shaft section, are not only capable of yielding axially relatively to each other, but are also capable of flexing laterally relatively to each other. Furthermore, the magneto tapered shaft section may be adjusted relatively with relation to the socket, so as to effectively make and break the magneto circuit. Interposed between the heads of the bolts 20 and one face of the flexible disk are washers 23. By means of the washers 23 and those on the opposite face of the flexible disk, wear upon the disk is considerably avoided.

The invention having been set forth, what is claimed as new and useful is:

1. In a device as set forth, driving and driven members axially alined, a plate fast with the driving member, a flexible fiber disk connected to said plate and having lateral projecting flexible parts, a second plate operatively connected to the lateral flexible parts of the fiber disk, whereby the driving member is capable of movement relatively to the second plate, a driven member having a tapered end, the second plate having a tapered socket, a coupling socket engaging the tapered end of the driven member, and detachably and operatively engaging in the socket of the second plate, means passing transversely of the tapered end of the driven member and the coupling socket for detachably connecting said parts, said coupling socket having a reduced threaded extension engaging through the second plate axially with the socket, and a device on said reduced extension for drawing the coupling socket into the socket of the second plate.

2. In a device as set forth, driving and driven members, a plate operatively movable with the driving member, a fiber element operatively connected to the plate and having flexible parts extending laterally from the plate at right angles to the driving member, a second plate having rigid parts extending laterally in the same plane with the flexible parts of the fiber element, means operatively connecting the rigid and flexible parts, the driven member having a tapered end, the second plate having a tapered socket axially concentric with the driving and driven members, a coupling socket having an exterior taper and adapted to engage within the socket of the second plate, whereby the end of the coupling socket is spaced from the second plate, said coupling socket having a socket, the inner wall of which is tapered to receive the tapered end of the driven member, means for securing the coupling socket to the tapered end of the driven member detachably, the coupling socket having a reduced threaded extension axially alined with the driving and driven members to engage through the second plate, and means on said reduced extension for drawing the coupling socket into the socket of the second plate.

3. In a device as set forth, driving and driven members, a fiber element disposed in a plane at right angles to the driving member and operatively and concentrically connected thereto, said element having flexible parts extending laterally, a second plate in parallelism with the fiber element, means operatively connecting the flexible parts and the second plate, the driven member having a tapered end, the second plate having a receiving tapered socket, a coupling device interposed between and operatively fitting and connecting the tapered end and the tapered socket of the second plate, and means detachably connecting the device to the tapered end, and means for securing the device adjustably within and relatively to the socket of the second plate.

In testimony whereof I hereunto affix my signature.

RAY D. HILLS.